United States Patent
Inserra Imparato et al.

(10) Patent No.: US 8,323,446 B2
(45) Date of Patent: Dec. 4, 2012

(54) CURING METHOD AND APPARATUS FOR MANUFACTURING BEAMS OF COMPOSITE MATERIAL WITH A J-SHAPED CROSS-SECTION

(75) Inventors: Sabato Inserra Imparato, Gragnano (IT); Giovanni Lanfranco, Villanova D'asti (IT)

(73) Assignee: Alenia Aeronautica S.p.A., Pomigliano D'Arco, Napoli (IT)

( * ) Notice: Subject to any disclaimer, the term of this patent is extended or adjusted under 35 U.S.C. 154(b) by 371 days.

(21) Appl. No.: 12/664,644

(22) PCT Filed: Jun. 10, 2008

(86) PCT No.: PCT/IB2008/052289
§ 371 (c)(1),
(2), (4) Date: Dec. 14, 2009

(87) PCT Pub. No.: WO2008/152582
PCT Pub. Date: Dec. 18, 2008

(65) Prior Publication Data
US 2010/0181016 A1    Jul. 22, 2010

(30) Foreign Application Priority Data
Jun. 14, 2007   (IT) ................ TO2007A0423

(51) Int. Cl.
*B29C 70/44*    (2006.01)
(52) U.S. Cl. ......... 156/285; 156/286; 264/101; 264/102
(58) Field of Classification Search ............. 156/228, 156/242, 245, 285, 286, 382; 264/101, 102
See application file for complete search history.

(56) References Cited

U.S. PATENT DOCUMENTS

| 4,512,836 A | 4/1985 | Tucci | |
|---|---|---|---|
| 2002/0144401 A1* | 10/2002 | Nogueroles Vines et al. | 29/897.2 |
| 2004/0065409 A1* | 4/2004 | Lindsay et al. | 156/285 |

FOREIGN PATENT DOCUMENTS

| EP | 1 031 406 A1 | 2/1999 |
|---|---|---|
| EP | 1 231 046 A2 | 2/2002 |

* cited by examiner

*Primary Examiner* — Khanh P Nguyen
*Assistant Examiner* — John Blades
(74) *Attorney, Agent, or Firm* — Merchant & Gould P.C.

(57) ABSTRACT

In order to manufacture beams of composite material with a J-shaped cross-section, a curing apparatus includes a bar supported parallel to a table by two end supports. A J-shaped beam of uncured composite material is prepared and arranged on the apparatus, positioning the bottom flange of the beam so that it faces the table and resting the web and the upper flange against two respective sides of the bar. The beam is covered with a vacuum bag and pressure and heat are applied inside an autoclave in order to cure the resin in the beam.

5 Claims, 2 Drawing Sheets

CURING METHOD AND APPARATUS FOR MANUFACTURING BEAMS OF COMPOSITE MATERIAL WITH A J-SHAPED CROSS-SECTION

This application is a National Stage Application of PCT/IB2008/052289, filed 10 Jun. 2008, which claims benefit of Serial No. TO2007A000423, filed 14 Jun. 2007 in Italy and which applications are incorporated herein by reference. To the extent appropriate, a claim of priority is made to each of the above disclosed applications.

BACKGROUND OF THE INVENTION

The present invention relates to a curing method and apparatus for manufacturing beams of composite material with a J-shaped cross-section.

In order to construct complex structures in the aeronautical sector or for other applications it is often required to manufacture low-weight and high-rigidity beams made of composite material, with a J-shaped cross-section (FIG. 1). For some of these applications, for example for floor beams for passenger aircraft it is of particular importance to ensure the geometrical precision of the beam. Above all, it is necessary to ensure that the sill or bottom flange of the J-shaped cross-section is flat since the floor members and the core by means of which the beam is connected to the frames of the fuselage are attached thereto.

In order to manufacture the composite beams so-called curing tools are used, said tools consisting of supports able to give the beam its final form by means of the simultaneous application of pressure and heat inside an autoclave. In fact, the pressure allows compaction of the various layers forming the beam while the heat initially assists compaction, favouring fluidification of the resin, and subsequently activates the resin curing reaction which gives it its final structure. The curing tool has the function of supporting and containing the beam during these phases.

The current technology is based on the use of metal apparatus of the type comprising mould and counter-mould which completely surround the part (FIG. 2). The beam to be cured is positioned on one of the metal parts and enclosed by the other parts of the apparatus which can be disassembled and are movable. The whole assembly is then closed inside the so-called vacuum bag formed by a polyamide (nylon) film to which the vacuum is applied. The assembly is then placed inside an autoclave where a combination of pressure and heat with a predefined temporal progression is applied. The pressure applied to the vacuum bag is transmitted to the metal parts of the apparatus which in turn transmit the pressure onto the beam. As a result of this compaction, the pressure together with the simultaneous increase in temperature causes consolidation and cure of the resin.

The present state of the art has a certain number of drawbacks.

The application of pressure onto the beam occurs not directly but via rigid metal parts with the result that, if they are not perfectly joined together or their geometrical form does not correspond perfectly to the beam to be produced, greater pressure will be applied to the beam in certain zones and less pressure will be applied in other zones. This means that in higher-pressure zones the resin will be impoverished with a reduction in the local thickness of the beam, while in the zones where the pressure is lower there may exist poor compaction with possible porosity of the beam. This problem is particularly critical in the case of beams which have variable thicknesses to reduce weight.

An imperfect joint between the edge of the beam to be cured and the edge of the apparatus creates empty volumes into which the resin tends to flow as a result of the pressure, thus impoverishing the beam and causing a reduction in the thickness.

The apparatus has a considerable weight and therefore suitable handling means are required.

The apparatus composed of many components has high cleaning and maintenance costs.

SUMMARY OF THE INVENTION

The object of the present invention, therefore, is to overcome the abovementioned drawbacks and in particular to manufacture J-shaped beams which have a high degree of geometrical precision.

BRIEF DESCRIPTION OF THE DRAWINGS

A preferred, but non-limiting embodiment of the invention will now be described. Reference is made to the accompanying drawings in which.

DETAILED DESCRIPTION OF THE PREFERRED EMBODIMENTS

Figure 1:
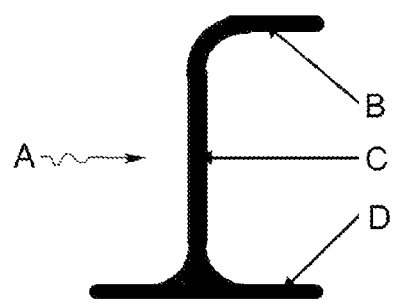
FIG. 1 is a cross-sectional view of a J-shaped beam to which the invention refers.
Figure 2:
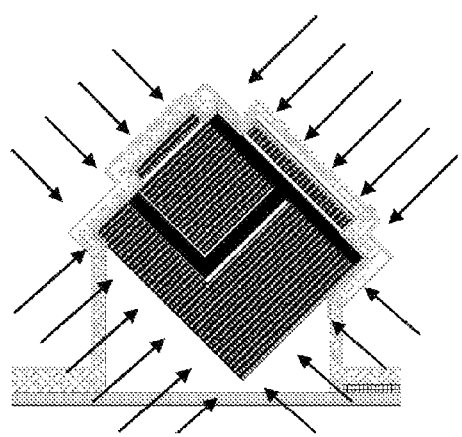
FIG. 2 is a cross-sectional view of an apparatus of the known type used in the curing step of a J-shaped beam.
Figure 3:
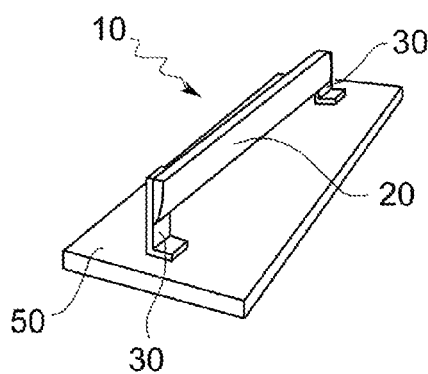
FIG. 3 is a schematic perspective view of a curing apparatus according to the invention.
Figure 4:
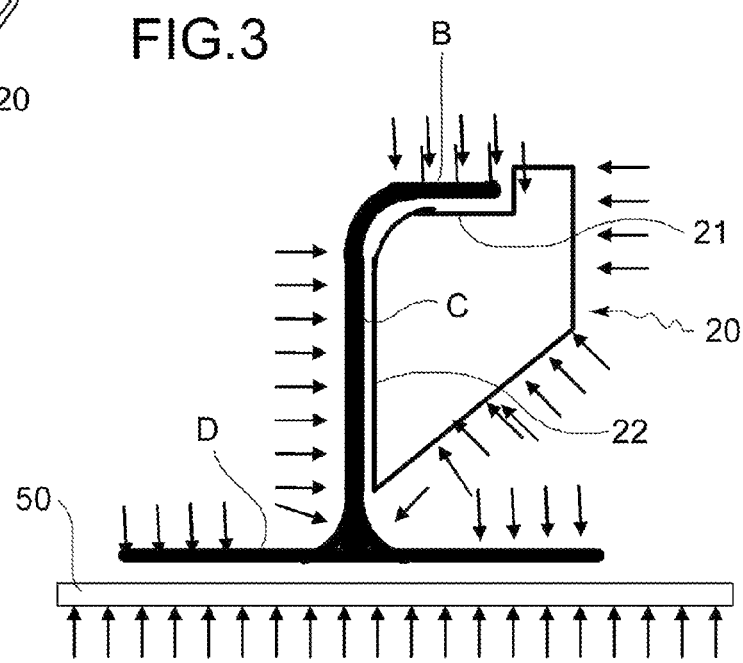
FIG. 4 is a schematic cross-sectional view which shows the pressures acting inside an autoclave on a beam to be cured which is positioned on an apparatus in accordance with the present invention.
Figure 5:
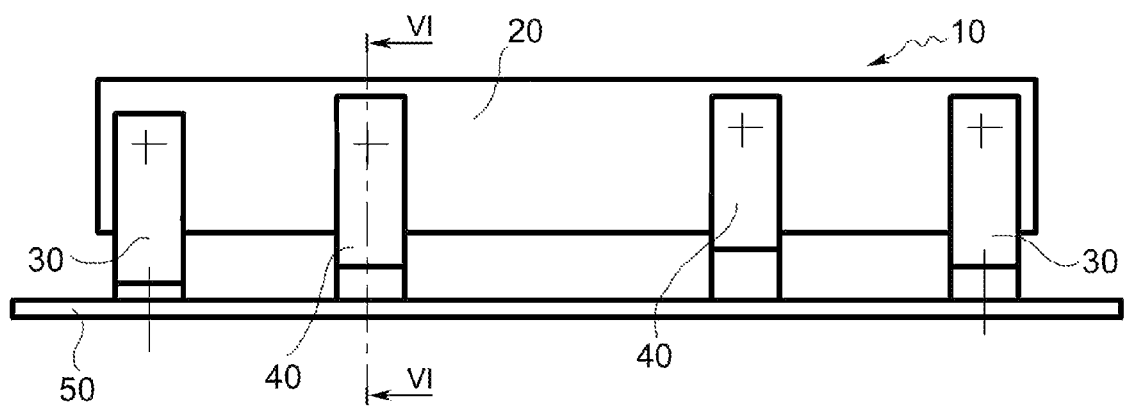
FIG. 5 is a side view of the apparatus according to the invention.

In order to manufacture a beam A of composite material with a J-shaped cross-section of the type shown in FIG. 1, it is required first of all to prepare the J-shaped beam in the uncured state, by means of processes which are known per se. These processes include flat lay up of fiber layers preimpregnated with resin, hot-forming parts with cross-sections of varying shapes (C-shaped, L-shaped, Z-shaped) and joining together these components by means of auxiliary equipment, thus obtaining the J-shaped cross-section.

The uncured beam is positioned on a suspended-bar curing apparatus, which is denoted overall by 10 and shown schematically in FIGS. 3, 5, 6A, 6B. The apparatus 10 comprises a straight horizontal bar 20 suspended from end supports 30 and from one or more intermediate supports 40 (not shown in FIG. 3) mounted on a horizontal base surface or table 50.

The suspended bar 20 in the example shown has a substantially trapezoidal cross-section, with a form known per se, which is constant over its entire length. The bar 20 has an upper horizontal surface 21 able to support from underneath the upper flange B of the beam and a vertical side surface 22 for resting against it one of the two sides of the web C. The bar 20 may be made of any material (steel, invar, composite materials, etc.) able to satisfy the rigidity requirements and withstand the temperature and pressure required for curing the beam.

The base table 50 has the function of supporting the suspended bar 20 by means of the end supports and ensuring that the sill D of the J-shaped beam has the desired flat form. Therefore the table must have suitable rigidity and surface quality characteristics. The table must satisfy requirements similar to those of the suspended bar 20 and therefore may be made with the same material as the latter.

The end supports 30 keep the bar 20 raised parallel to the table 50 and spaced from the latter so that the sill or flange D of the J-shaped beam is at a calibrated distance (roughly 0.1-0.2 mm) from the base table (with a calibrated gap) and the upper flange B rests on the upper surface 21 of the suspended bar. The connection between the bar 20 and the end supports 30 is performed by means of centering pins and bolts. The connection between the end supports 30 and the base table 50 is achieved in a similar manner. The end supports 30 should not be removed, except for extraordinary maintenance of the apparatus, and therefore may be fixed to the table 50 for example by means of welding.

The intermediate supports 40 can be connected laterally to the bar 20 and, resting on the table 50, create a further series of supports for the purpose of decreasing the span of the suspended bar and reducing its bending. The intermediate supports 40, which are two in number in the example shown, are mounted removably on the apparatus 10 since, in order to facilitate the formation of the vacuum bag on the beam, they must be positioned during an intermediate stage of the process, as described further below. Therefore the intermediate supports 40 are connected to the bar 20 and to the table 50 by means of screws and pins which can be easily disassembled.

The number and the spatial distribution of the intermediate supports 40 must be determined depending on the length and height of the beam to be manufactured, in particular its slender profile. In the case of beams for the floor of a passenger aircraft, which for certain applications must have a length of about 3.20 m, and a height of about 110 mm, it was possible to establish during tests that, if at least one intermediate support is missing, the suspended bar during pressurisation inside the autoclave is subject, in addition to its own weight, to the action of unbalanced pressure forces which cause bowing, by an unacceptable amount, of the bar and hence the upper flange of the J-shaped beam, with a camber of about 7 mm.

A preferential sequence of steps for the preferred implementation of the method according to the invention is now described. By way of a preliminary step, the apparatus 10 is arranged with the bar 20 fastened at its ends by means of the fixed supports 30 above the table 50 and parallel to the latter. It is required to clean and apply a separating agent on the surfaces of the apparatus which will make contact with the beam to be cured. A beam A of uncured composite material with a J-shaped cross-section is prepared separately using known methods, as described above.

The uncured J-shaped beam thus obtained is positioned on the suspended bar 20, resting the upper flange B and the core C against the surfaces 21 and 22 of the bar 20.

Figure 6A:
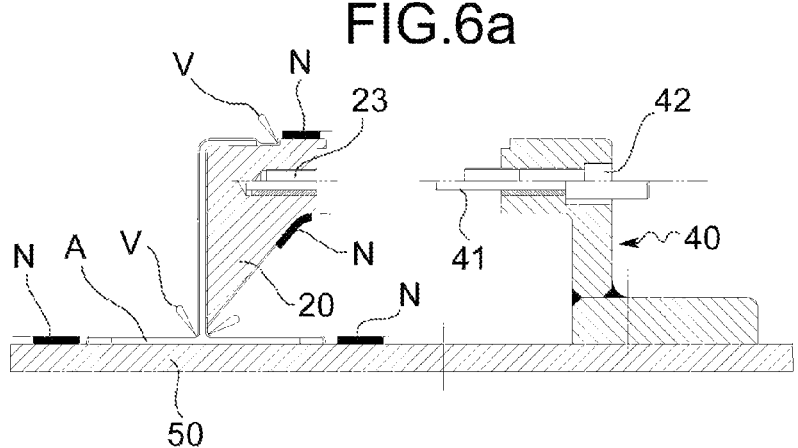
FIGS. 6A and 6B are cross-sectional views, along the line VI-VI in FIG. 5, which show two different operating positions of a support forming part of the apparatus according to the invention.
Figure 6B:
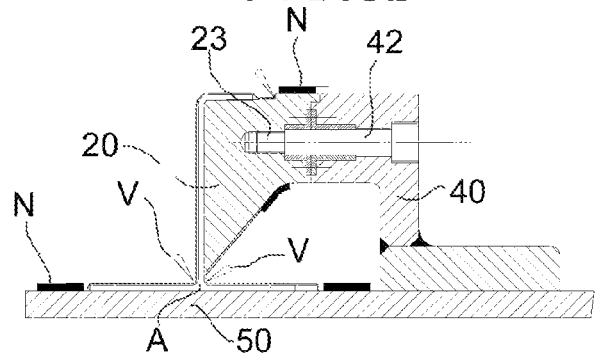

The vacuum bag is then prepared using techniques known in the field, for example by positioning on one side of the beam not in contact with the apparatus a high-temperature separating film, followed by a layer of ventilation fabric and finally a nylon film of suitable thickness which has the function of enclosing the beam in order to form the so-called vacuum bag. Then the edges of the vacuum bag are sealed on the base table using a suitable sealing tape N (FIG. 6A).

Thereafter openings or windows are formed in the vacuum bag in the side zones of the suspended bar where the intermediate supports 40 will be positioned. The edges of these openings are sealed completely using sealing tape or mastic N.

After inserting in the vacuum bag a suitable number of valves for applying the vacuum, a low vacuum is applied to the bag, this vacuum having a value which will have been calculated to avoid unacceptable bowing of the beam and the suspended bar in the absence of the intermediate supports.

Then one or more intermediate supports 40, suitably spaced or equally spaced from the end supports 30, are arranged in position. The intermediate supports 40 are rigidly fixed (FIG. 6B) to the bar 20 and to the table 50 using the removable fixing members. Preferably fixing of the intermediate supports 40 is performed with the aid of centering pins 41 introduced into respective aligned holes 42 and 23 of the intermediate supports 40 and the bar 20, respectively. The assembly comprising the apparatus 10 with the beam covered by the vacuum bag is placed inside an autoclave, where the temperatures and pressures necessary for curing the resin of the beam are applied using known methods.

It is preferable to keep the flange D of the beam suspended slightly above the table 50 to avoid the formation of unacceptable wrinkles during the curing step. The uncured J-shaped beam has a form which is not perfect and not final. The beam is prepared so that vertically it is a little less high than its final dimensions so that, when the upper flange B of the beam is resting on the suspended bar 20, a gap remains between the bottom sill D and the table 50. Preferably the gap must not be more than about 0.2 mm, otherwise it would create problems as regards compaction of the nodal point. Inside the autoclave the pressure acting on the vacuum bag tends to press the beam, moving the sill against the table 50 during curing. It has been established that if, instead, the uncured beam is slightly higher and the bottom cap D rests on the table 50 before entry into the autoclave, as a result of the pressure a gap may form between the upper flange B of the beam and the upper side 21 of the suspended bar. In these conditions, the bag V, when pressing, may create an unacceptable wrinkle.

As can be understood, the invention achieves various advantages compared to the state of the art discussed in the introduction. The compaction pressure is applied uniformly to the beam; this ensures that the thicknesses of the beam are within the tolerances and avoids problems of porosity due to areas where the pressured applied is insufficient. The apparatus does not have cavities which are able to receive quantities of resin which, flowing from the beam, could cause a reduction in the thickness thereof. The sill or bottom flange of the section is compacted against a flat surface which is precisely related to the suspended bar. The apparatus is composed of a few parts and therefore may be easily cleaned and maintained. It is possible to manufacture with precision J-shaped beams of any length and height, owing to the fact that the intermediate supports practically eliminate, or at least reduce drastically the problems of excessive bending of the suspended bar resulting from the slender profile of the beam and the loads acting inside the autoclave.

It is understood that the invention is not limited to the constructional form described and illustrated here, which is to be regarded as an example of embodiment; the invention instead may be subject to modifications relating to the form and arrangement of parts, constructional and operating details.

The invention claimed is:

1. A method for manufacturing beams of composite material with a J-shaped cross-section, comprising the steps of:
providing a curing tooling comprising a bar supported parallel to a table by at least two first rigid supports,
providing a beam with a J-shaped cross-section made of uncured composite material, the beam having a bottom flange, a web and an upper flange;
arranging the uncured beam on the tooling, positioning the bottom flange of the beam so that the bottom flange faces the table at a distance above the table, and resting the web and the upper flange against two respective sides of the bar,
covering the beam to be polymerized with at least one vacuum bag,
applying a vacuum to the bag,
applying pressure and heat inside an the autoclave to cure the resin in the beam.

2. A method according to claim 1, comprising the further step of:
connecting the bar to the table by at least one further rigid support in at least one intermediate position between the first supports.

3. A method according to claim 2, wherein the step of connecting the further intermediate support is performed after the step of covering with the vacuum bag.

4. A method according to claim 2, wherein the step of covering the vacuum bag includes the step of covering the bar with a vacuum bag and forming at least one opening inside the vacuum bag in a zone or zones where the bar is connected to each intermediate support and then sealing the edges of the opening(s).

5. A method according to claim 1, wherein the bottom flange of the beam is situated at a distance of about 0.1-0.2 mm above the table during the step of arranging the uncured beam.

* * * * *